(12) United States Patent
Helmolt et al.

(10) Patent No.: US 7,957,997 B2
(45) Date of Patent: Jun. 7, 2011

(54) SYSTEMS AND METHODS FOR THIRD PARTY ORDER PROCESSING

(75) Inventors: Hans-Ulrich von Helmolt, Heidelberg (DE); Guenther Deeg, St. Ingbert (DE); Patricia Luz, Stuttgart (DE)

(73) Assignee: SAP AG, Walldorf (DE)

( * ) Notice: Subject to any disclaimer, the term of this patent is extended or adjusted under 35 U.S.C. 154(b) by 1218 days.

(21) Appl. No.: 11/633,407

(22) Filed: Dec. 5, 2006

(65) Prior Publication Data

US 2007/0129985 A1    Jun. 7, 2007

(30) Foreign Application Priority Data

Dec. 5, 2005   (EP) .................................... 05111708

(51) Int. Cl.
*G06F 17/00* (2006.01)

(52) U.S. Cl. ..................................................... 705/7.12

(58) Field of Classification Search ............... 705/8, 7.12
See application file for complete search history.

(56) References Cited

U.S. PATENT DOCUMENTS 5,936,860 A * 8/1999 Arnold et al. ................... 700/95

* cited by examiner

*Primary Examiner* — Thomas Dixon
(74) *Attorney, Agent, or Firm* — Finnegan, Henderson, Farabow, Garrett & Dunner, LLP (57) ABSTRACT

Systems and methods are provided for processing a product order which is directed from a customer to a first supplier. In one implementation, a computer-implemented method is provided that includes receiving a product order from a customer. Based on the received product order, the method determines products to be procured by a supplier that is external with respect to the first supplier. The method further determines at least one external supplier which is able to provide the products and transmits a purchase order for the available products to the external supplier.

18 Claims, 7 Drawing Sheets

SYSTEMS AND METHODS FOR THIRD PARTY ORDER PROCESSING

BACKGROUND

1. Technical Field

The present invention generally relates to the field of data processing and to computerized systems and methods for managing products within e-business systems. More particularly, and without limitation, the invention relates to methods and systems for optimizing the delivery process of ordered products from a supplier to a customer by third party order processing.

2. Background Information

Today, the success of a company depends essentially on the requirement that demands on goods and/or services be fulfilled precisely, cost-efficiently and in time. Accordingly, many companies make use of management system to control and optimize their production and delivery processes.

Supply chain management may include the process of coordinating the flow of goods, services, information, and/or finances between parties such as manufactures, suppliers, wholesalers, retailers, and consumers. This process may include, among other things, order processing, information feedback, and timely delivery of ordered goods and/or services.

Processes within supply chain management may include checking whether a quantity of products ordered by a customer is available at some location, for example, warehouses and production plants, at a given time. This is denoted as an "Available-to-Promise" (ATP) check, or availability check. Various ways of selecting particular locations and checking these locations as to availability of the quantity of products may be defined using a number of rules. These rules are denoted as "ATP rules." The rules to be applied may be determined based on the particular order which is to be ATP checked. For example, if an external supplier is involved in the supply chain, then the products of this external supplier may be delivered directly from the external supplier to the customer. However, conventional systems and methods do not provide a means to optimize a delivery process for ordered products from a supplier to a customer by third party order processing.

SUMMARY

In view of the foregoing, systems and methods are disclosed herein for overcoming one or more of the above-mentioned problems. In accordance with embodiments of the invention, systems and methods may be provided for managing products within e-business systems. More specifically, embodiments of the invention include systems and methods for optimizing the delivery process of ordered products from a supplier to a customer by third party order processing.

Consistent with an embodiment of the present invention, a computer-implemented method processes a product order which is directed from a customer to a first supplier. The method may include receiving a product order from a customer, determining, based on the received product order, products which are to be procured by a supplier which is external with respect to the first supplier, determining at least one external supplier which is able to provide the products, and transmitting a purchase order for the available products to the external supplier.

In the above-described method, determining the at least one external supplier may be performed by evaluating data representative of at least one of contracts and scheduling agreements between a product order receiver and at least one external supplier, and data which is related to an ordered product.

Furthermore, the method may comprise a step of evaluating a plurality of ATP rules, each ATP rule comprising at least one check instruction. The check instruction may comprise at least a first field indicating how the third party order process with respect to the at least one external supplier has to be done, and a second field indicating how the determination of the at least one external supplier has to be done. Additionally, the first field may store a value specifying how the check is done.

In another embodiment, the method may further comprise a step of shipping the products found to be available at the external supplier to a consolidation location, and processing the products at the consolidation location.

Consistent with yet another embodiment, an apparatus may be provided for third party order processing. The apparatus may include a data storage device for storing a plurality of ATP rules, contracts and scheduling agreements, and product-related data. Additionally, the apparatus may include means for determining products which are located with an external supplier, means for determining at least one external supplier which is able to provide the products, and means creating at least one purchase order and transmitting the at least one purchase order to the at least one external supplier.

Consistent with embodiments of the invention, a rule based ATP check may be performed to verify the validity of a third party order process for the customer order. Furthermore, the chance to fulfill a customer order can be maximized because an external supplier may deliver a part of the ordered products if they are not available with the supplier which received the customer order.

Additional embodiments of the present invention relate to a computer-readable medium comprising computer-executable instructions, which when loaded into a computer system, perform methods consistent with the present invention, such as that described herein.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Figure 1:
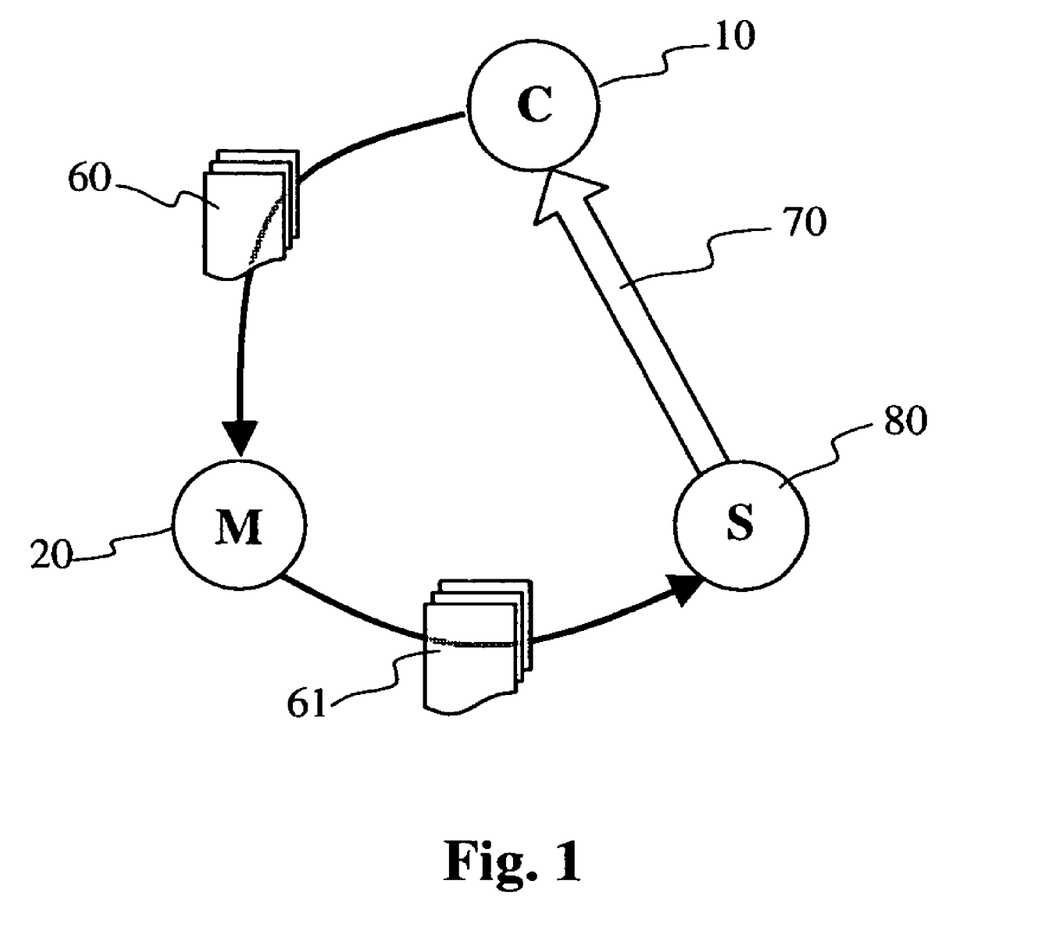
FIG. 1 illustrates an exemplary delivery process from an external supplier to the customer, consistent with an embodiment of the present invention.

FIG. 1 shows an example of a delivery process from an external supplier to the customer, consistent with an embodiment of the invention. Customer 10 sends an order 60 to supplier 20. In this example, supplier 20 is represented by a manufacturer. Order 60 may be in the form of an electronic order transmitted by email or a traditional order transmitted by mail, for example. Order 60 comprises at least information about the ordered product and the ordered quantity.

In the example of FIG. 1, supplier 20 checks whether an external supplier can deliver the ordered products to customer 10. This check may be done based on stored data about each external supplier, e.g., product data or supply agreements, in the supply chain management system with supplier 20. If supplier 20 finds an external supplier, supplier 20 forwards order 61 as a purchase order to the identified external supplier 80. Forwarded order 61 may be a part of order 60 or the whole order 60. In one embodiment, the external supplier may be an internal supplier.

Supplier 80 checks whether he can fulfill received order 61. This second check with external supplier 80 is necessary because it is possible that the data with supplier 20 may be out of date, for example. External supplier 80 may send a confirmation of the items of order 61 to supplier 20. The confirmation may comprise different times, dates and the whole or only a part of the requested quantities.

If external supplier 80 can fulfill the purchase order 61, then external supplier 80 delivers 70 the ordered products, or a part of them, to customer 10. To communicate this delivery, external supplier 80 sends an advanced shipping notification (ASN) to supplier 20. Since supplier 80 is an external supplier, the delivery process shown in FIG. 1 describes a type of external procurement and is called 'third party order processing'. In the following, the abbreviation "TPOP" is used for the term third party order processing.

Figure 2:
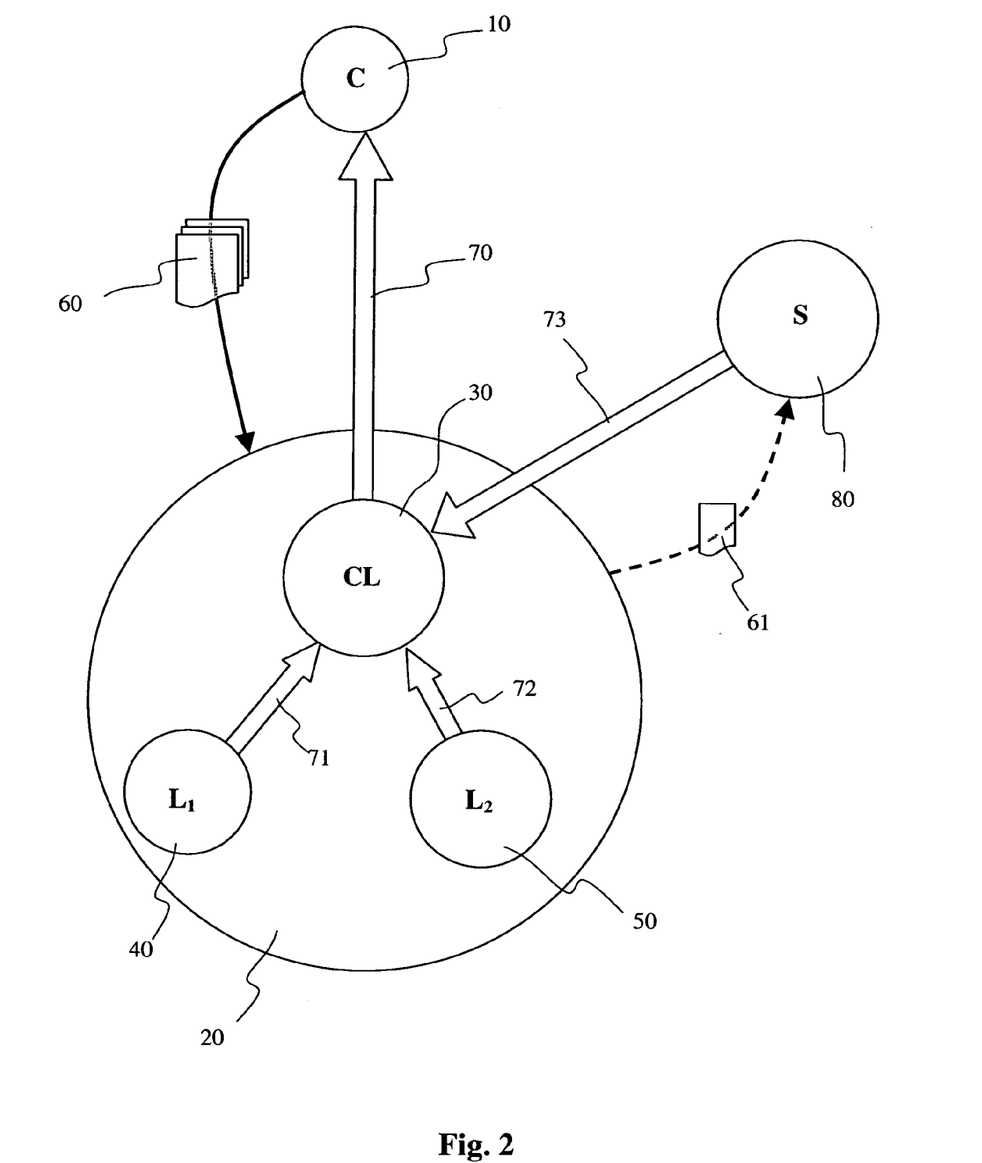
FIG. 2 illustrates an exemplary delivery process integrating the external supplier into the consolidation process, consistent with an embodiment of the present invention.

FIG. 2 shows an example of a delivery process whereby the delivery of the external supplier is first shipped to a consolidation location before being delivered to the customer. Consolidation of deliveries means that these deliveries are to be processed at a special location, before they are shipped to the customer. The location where consolidation is done is denoted as a "consolidation location." A reason for performing consolidation may be, for example, the need to send the ordered products with just one delivery to the customer. A further reason may be foreign trade or export business, for example, if only the consolidation location has the capability to prepare export licenses. Furthermore, in the consolidation location it is possible to merge several deliveries coming from different locations, also from external supplier locations, into one delivery. In one embodiment, the products of the internal locations are shipped using stock transfer orders to the consolidation location, i.e., the consolidation location is the target location of a stock transfer order. A stock transfer order is a purchase order used to request or instruct a plant or location to transport products from one plant or location to another plant or location within the same enterprise. A consolidation location may be defined in an ATP rule or may be overridden by an external software system, for example by a CRM sales order.

Which consolidation location is used for a delivery may be defined in a plurality of ATP rules, whereby the determination of the corresponding ATP rules to be applied is done based on a plurality of parameters, which come along with the corresponding order, for example customer or order fields. The ATP rules may also define alternative products for products which are temporarily not available, or for products for which successor products are available. Furthermore, the ATP rules may define alternative product locations, for example, if a product is not available during an availability check with a first product location. In this way, the consolidation locations may be freely defined according to different business requirements, the delivery of products may be better optimized, and the customers demand to deliver the ordered products in only one single delivery may be considered during the delivery process even if a part of the ordered products is provided by an external supplier.

Referring to the example of FIG. 2, internal supplier locations 40, 50 and consolidation location 30 belong to supplier 20. Further, external supplier 80 represents a third party supplier and does not belong to supplier 20.

Accordingly, customer 10 sends an order 60 to supplier 20. Once again, order 60 may be in the form of an electronic order transmitted by email or a traditional order transmitted by mail. Order 60 comprises at least information about the ordered product and the ordered quantity. In one embodiment, order 60 may additionally comprise the customer requirement that the ordered products should be delivered as one single delivery to customer 10. Supplier 20 may input or feed the data about order 60 into the supply chain management system which processes order 60. The supply chain management system stores miscellaneous information about a plurality of products. Such information may comprise the location in which the products are available and in which quantity the products are available. In FIG. 2, the ordered products may be provided by internal locations 40, 50 and consolidation location 30.

In one embodiment, the supply chain management system, after receiving customer order 60, performs an availability check process. In order to optimize the route of transportation and the transportation costs, the availability check process first checks consolidation location 30 for availability of the ordered products. Then, if the consolidation location does not confirm the required quantity of products, the availability check processes internal locations 40, 50. If internal locations 40, 50 provide the required quantity of products, the supply chain management system creates stock transfer orders for corresponding internal locations 40, 50.

If there remains a quantity of products which is not confirmed by these availability checks, the availability check process attempts to determine further locations which are able to provide the remaining quantity of products. Consistent with an aspect of the present invention and the embodiment of FIG. 2, such a location may be the external supplier location 80.

The supply chain management system of supplier 20, in addition to storing information about products with internal locations 40, 50 and consolidation location 30, stores information about one or more external suppliers, especially about the products to be provided. Therefore, the supply chain management system is able to determine external suppliers which can provide the remaining quantity of products.

If such an external supplier 80 exists, then the supply chain management system creates a purchase order 61 and forwards order 61 to external supplier 80. External supplier 80 may also perform an availability check of products according to the third-party purchase order 61. This is necessary because the information about external suppliers with supplier 20 may be out of date, for example.

Then external supplier 80 delivers 73 the confirmed products according to purchase order 61 to consolidation location 30. In one example, delivery may comprise only a part of the ordered products according to third-party purchase order 61. The products which are confirmed by internal locations 40, 50 are also delivered 71, 72 from internal locations 40, 50 to consolidation location 30. At consolidation location 30, the partial deliveries from the internal locations and the one or more external locations are merged and then shipped 70 as one single delivery from consolidation location 30 to customer 10.

In another embodiment, several products may be provided only by external suppliers. If customer order 60 comprises such a product, the supply chain management system with supplier 20 does not perform an availability check regarding consolidation location 30 or internal locations 40, 50. The information whether a product is provided only by external suppliers may be also part of the information about the external suppliers and their products within the supply chain management system. Therefore, it may be possible that whole customer order 60 is provided by one or more external suppliers.

Figure 3:
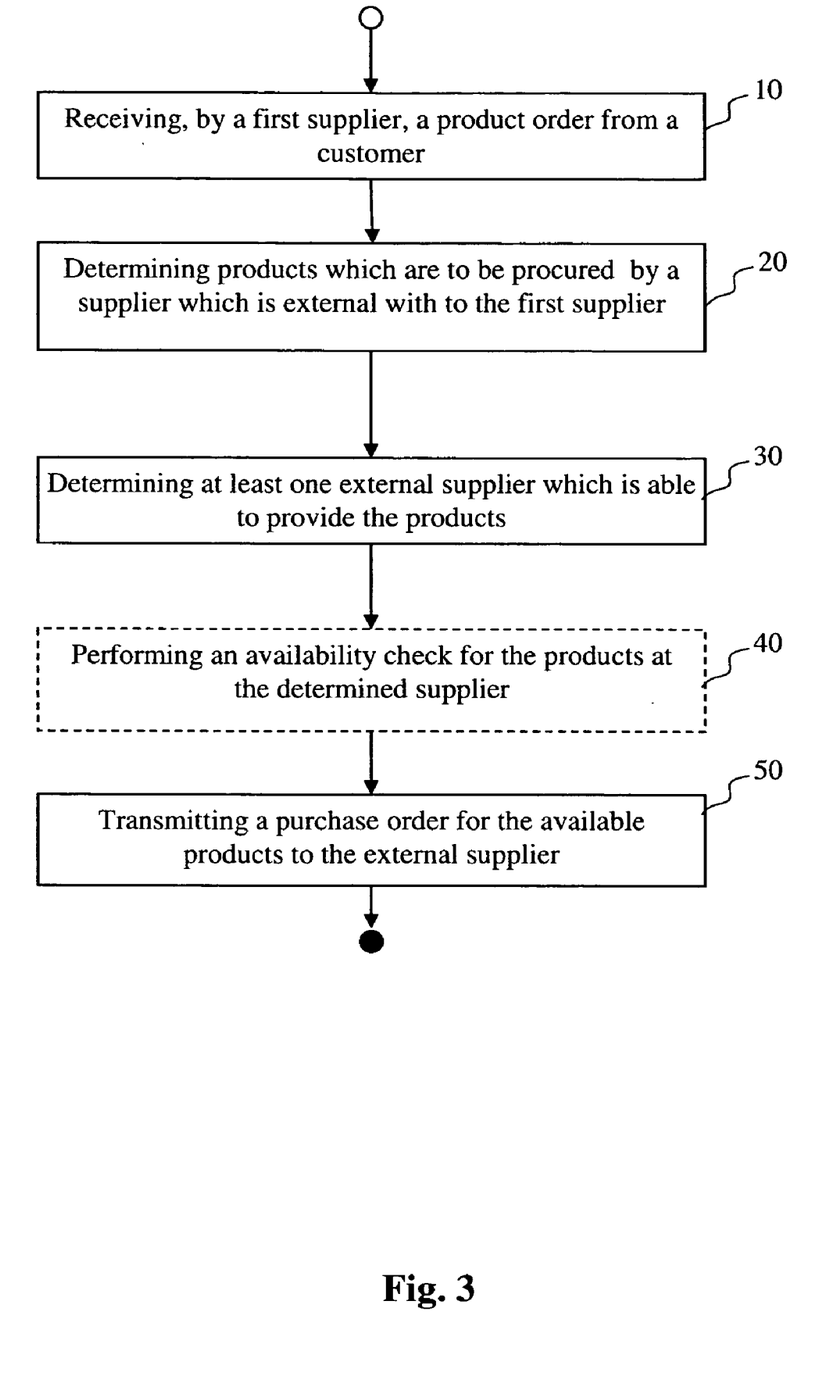
FIG. 3 illustrates an exemplary method, consistent with an embodiment of the present invention.

FIG. 3 illustrates an exemplary method, consistent with an embodiment of the present invention. In step 10, a first supplier receives a product order from a customer. Based on the received order, the products are determined which are to be procured by a supplier which is external with to the first supplier (step 20). Then, in step 30, at least one external supplier is determined which is able to provide the products. In step 40, an availability check for the products at the determined supplier may be performed. The availability check within step 40 may be performed against contracts and/or scheduling agreements and/or info records as described below for the field values for the check instruction SOS_EXECUTE_METH, for example. The exemplary method of FIG. 3 ends with step 50, wherein a purchase order for the available products is transmitted to the external supplier.

Figure 4:
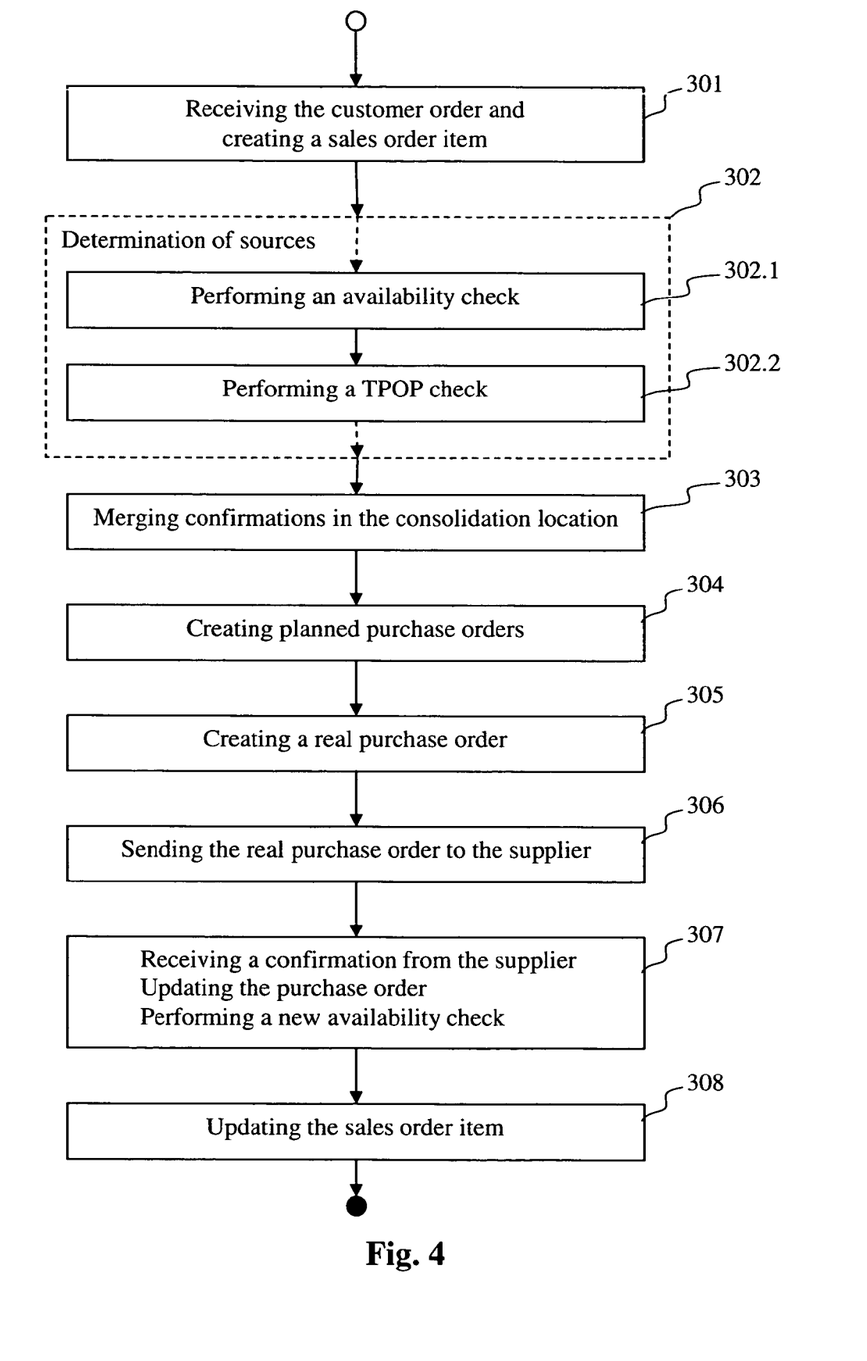
FIG. 4 illustrates a second exemplary method, consistent with an embodiment of the present invention.

FIG. 4 shows a more detailed exemplary method, consistent with an embodiment of the present invention. In the first step 301, the customer order comprising the ordered products and the quantity thereof is obtained. Within this step 301, sales order items may be created out of the customer order.

In the second step 302, comprising sub-steps 302.1 and 302.2, the sourcing locations are determined. The sourcing locations are the locations where the requested products according to the customer order are located. In one embodiment, the product data comprises a TPOP indicator having one of the following values: Always from supplier; Non TPOP; Mixed.

The value 'Always from supplier' may indicate that the product is provided always by a supplier, e.g., an external supplier. The value 'Non TPOP' may indicate that the product is provided by an internal location. Finally, the value 'Mixed' may indicate that the products are provided by an internal location and/or an external supplier. Within step 302, the sub-step 302.1 is performed first. In sub-step 302.1, an availability check is performed. The availability check may be a rules-based availability check or a non-rules-based availability check:

In one embodiment, the rules-based availability check determines and finds at least one ATP rule comprising a consolidation location and a substitution requirement for which TPOP is switched on. The consolidation location may be provided by an external software system, for example, a third-party customer relationship management. If a non-rules-based availability check is switched on but a consolidation location is given as override from the order and the check instruction defines that TPOP is switched on, then this results in the same processing and result structures as if ATP rules would have been switched on. Check instructions are settings in the supply chain management system specifying the methods or processes to be executed, as well as the execution of the rules-based availability check.

In one embodiment, the check instruction comprises two indicators for TPOP: SOS_EXECUTE; SOS_EXECUTE_METH. If these indicators are set, a source determination is executed in order to find a supplier. By way of example, valid values for the field SOS_EXECUTE may include: First availability check, then TPOP check; TPOP immediately; Only availability check, no TPOP.

In the first case, methods for performing an availability check are combined with the methods for performing a TPOP check. In the second case, TPOP is performed immediately. The basic methods for performing an availability check are not performed. In the third case, only the basic methods for performing an availability check are executed. In this case, TPOP is turned off.

The field value SOS_EXECUTE_METH may specify how the TPOP check has to be done. By way of example, valid values for the field SOS_EXECUTE_METH may include:
   Check against contracts;
   Check against scheduling agreements;
   Check against contracts and scheduling agreements;
   Check against contracts and info record;
   Check against scheduling agreements and info records;
   Check against contracts or scheduling agreements or info records; or
   No check against contracts or scheduling agreements.
   A valid combination of the two indicator values may be:
   SOS_EXECUTE: First availability check, then TPOP check; or
   SOS_EXECUTE_METH: Check against contracts.

In the next sub-step 302.2, a TPOP check is performed according to the determined substitution requirement in step 302.1. Checking against scheduling agreements may be done only in combination with the redirection of the corresponding scheduling agreements. A scheduling agreement normally exist only between external suppliers and internal suppliers (internal locations) which control quantities and dates of products to be delivered from the external supplier to the internal supplier. In the case that the deliveries from the external suppliers has to be consolidated in the consolidation location, the scheduling agreements between the external suppliers and the consolidation location has to be checked. Therefore, the scheduling agreements have to be redirected to the consolidation location. The TPOP check determines one or more suppliers which can provide the required products. If TPOP determines more than one supplier, than the first one is used.

The result of the second step 302 is a plurality of products confirmed by internal locations (in sub-step 302.1) and external locations (in sub-step 302.2).

These confirmations from all sourcing locations (internal and external) are merged and consolidated in the next step 303. Within this step 303, a controller structure is build-up, whereby for confirmations from external sourcing locations a separate consolidation requirement within the consolidation requirement group is created in order to distinguish between internal and external locations. This may be necessary if the supply chain management system has to trigger several special processes, for example, creation of orders or creation of vendor invoices, for the products from external suppliers. An example of a controller structure and how a controller structure may be built-up is shown in detail below with reference to FIGS. 5 and 6.

In the next step 304, planned purchase orders, also denoted "purchase requisition," are created. A planned purchase order has the supplier location as delivering location and the consolidation location as receiving location. These planned purchase orders are converted in step 305 to real purchase orders. A real purchase order represents a request to a vendor, an external supplier or a plant to deliver a certain quantity of a product or to perform certain services at a certain point in time. Afterwards, the planned purchase orders are deleted.

The method continues with step 306 wherein the real purchase orders are sent to the external supplier. The external supplier checks the received real purchase orders and sends back a confirmation. If the confirmation from the supplier is different from the real purchase order, then the real purchase order has to be updated with the confirmation dates in step 307. For example the confirmation can have different quantities and/or different delivery dates. A new availability check has to be done. The availability check is triggered during the update of the real purchase order. The availability check may perform a standard availability check against the updated real purchase order.

Within the next step 308, the sales order items are updated according to the updated purchase orders, if a purchase order update was made. If the external supplier cancels the purchase order completely, this external supplier is stored with the respective sales order item. When triggering a further availability check for this sales order item, the system hands over this supplier as external exclusion. That way, it is assured that the availability check does not select the same supplier again.

Figure 5:
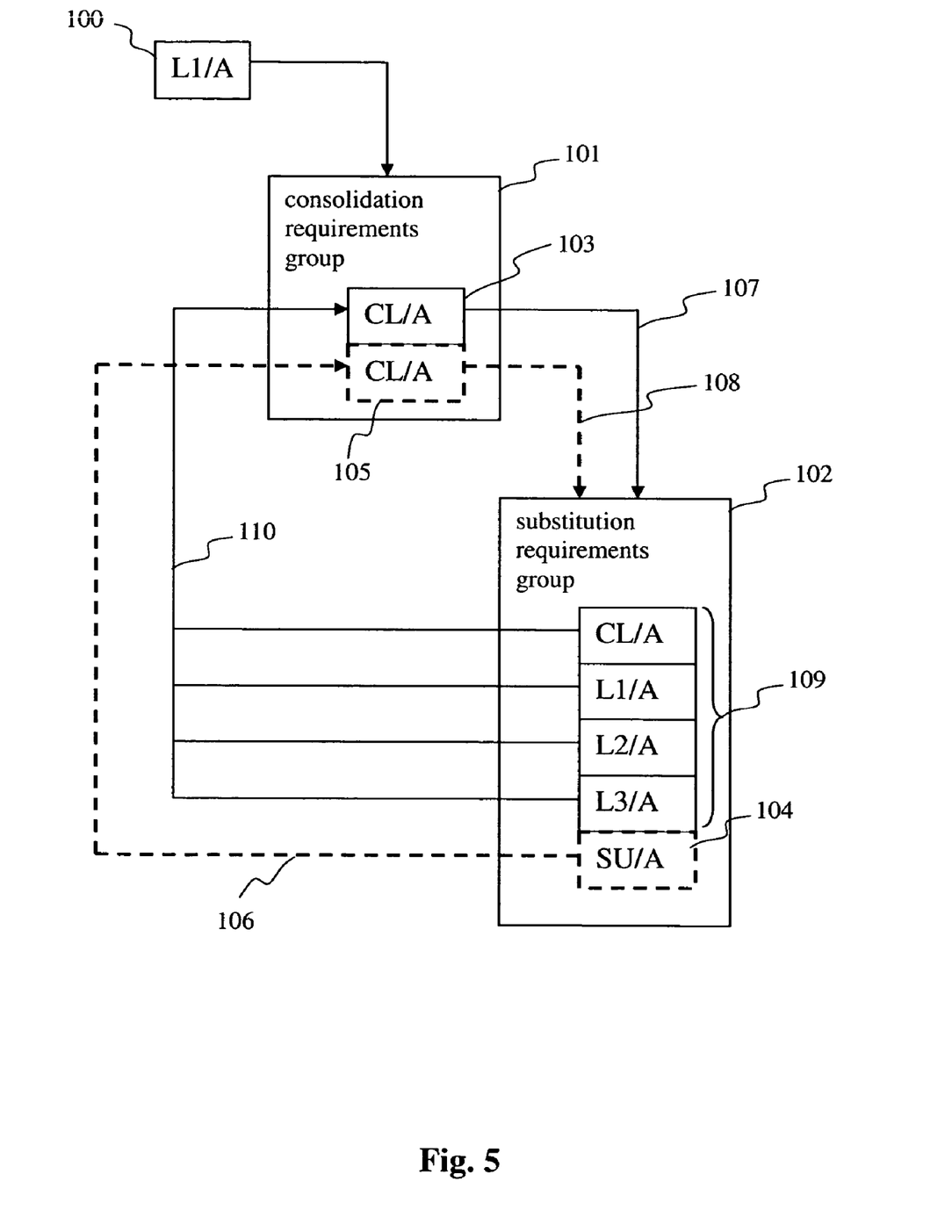
FIG. 5 illustrates an exemplary controller structure, consistent with an embodiment of the present invention.
Figure 6:
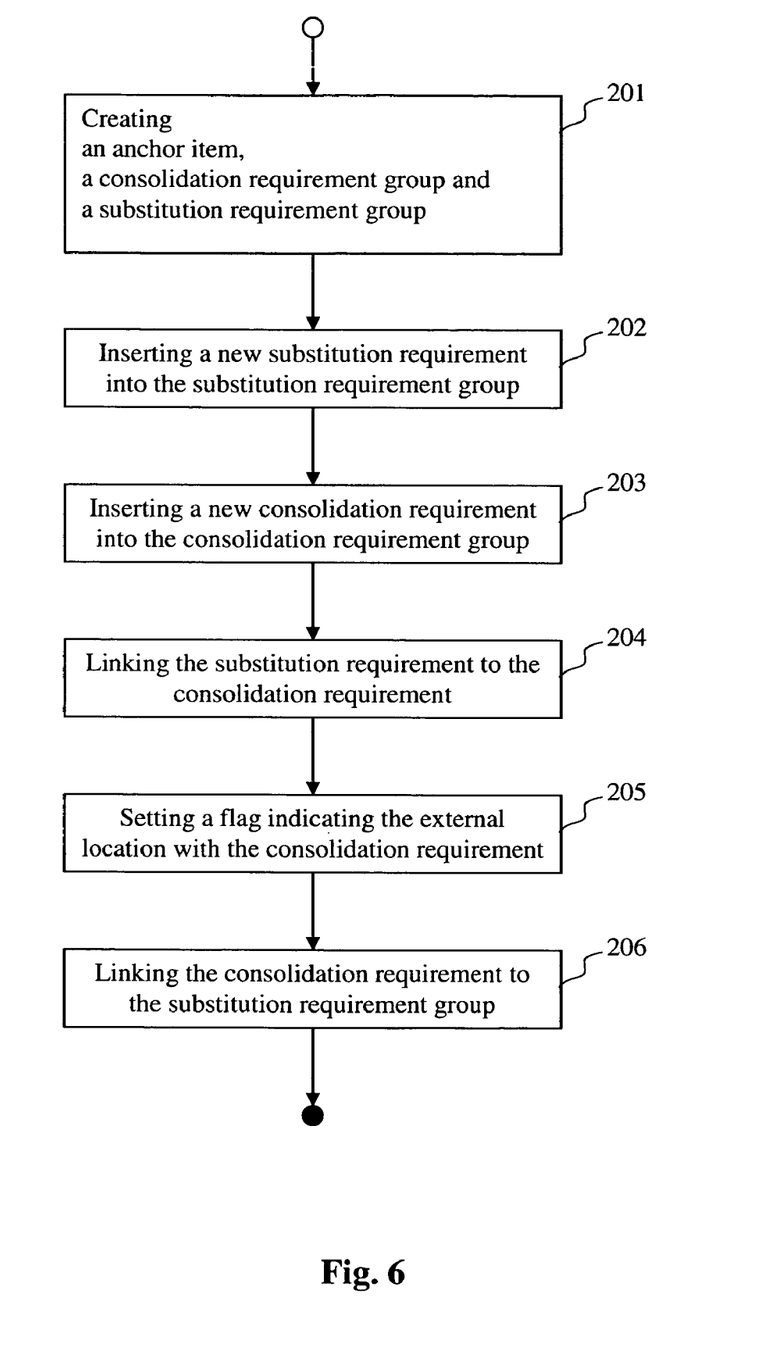
FIG. 6 illustrates an exemplary method for building-up a controller structure, consistent with an embodiment of the present invention.

FIG. 5 illustrates an exemplary controller structure and FIG. 6 illustrates an exemplary program flow for building-up a controller structure.

With reference to the example of FIG. 5, assume product A is consolidated in consolidation location CL. Further, assume the location determination finds internal locations L1, L2 and L3, which are checked for product availability. In addition, for the last substitution requirement L3, TPOP is switched on which lead to the supplier location SU.

As shown in FIG. 5, the controller structure includes an anchor item 100, which is linked with a consolidation requirement group 101. Consolidation requirement group 101 includes consolidation requirements 103 and 105. Each consolidation requirement 103, 105 is linked 107, 108 with substitution requirement group 102. Consolidation requirement 103 represents the consolidation requirement for internal locations L1, L2, L3 and CL. Consolidation requirement 105 represents the consolidation requirement for the supplier location 104. Substitution requirement group 102 comprises substitution requirements 109 according to the result of the location determination. Furthermore, substitution requirement group 102 comprises TPOP substitution requirement 104. Each of substitution requirements 109 is linked 110 with consolidation requirement 103. Substitution requirement 104 is linked 106 with consolidation requirement 105.

Building-up the controller structure of FIG. 5, as shown in the exemplary process of FIG. 6, may start by creating anchor item 100 in step 201. Within step 201, consolidation requirement group 101 and substitution requirement group 102 are created. Anchor item 100 is linked to consolidation requirement group 101. Within step 201, the method creates consolidation requirement 103 and inserts this into consolidation requirement group 101. Substitution requirements 109 are also created and inserted into substitution requirement group 102. Substitution requirement group 102 is inserted as a successor into the substitution requirement 103 by creating a link 107 between consolidation requirement 103 and substitution requirement group 102. Substitution requirements 109 are also linked 110 to consolidation requirement 103. The intermediate result is a controller structure containing all substitution requirements 109 and consolidation requirement 103 according to the internal locations.

In the next step 202, new substitution requirement 104 for the external location—the supplier location—is inserted into substitution requirement group 102. In order to distinguish between internal and external locations, in the next step 203, a new consolidation requirement 105 with respect to new substitution requirement 104 is inserted into consolidation requirement group 101.

Within the following step 204, consolidation requirement 105 is inserted as a successor 106 into substitution requirement 104.

In step 205, a flag is set within consolidation requirement 105, which indicates that consolidation requirement 105 is representing a requirement containing external product locations. Finally, in step 206, consolidation requirement 105 is linked 108 to substitution requirement group 102.

Figure 7:
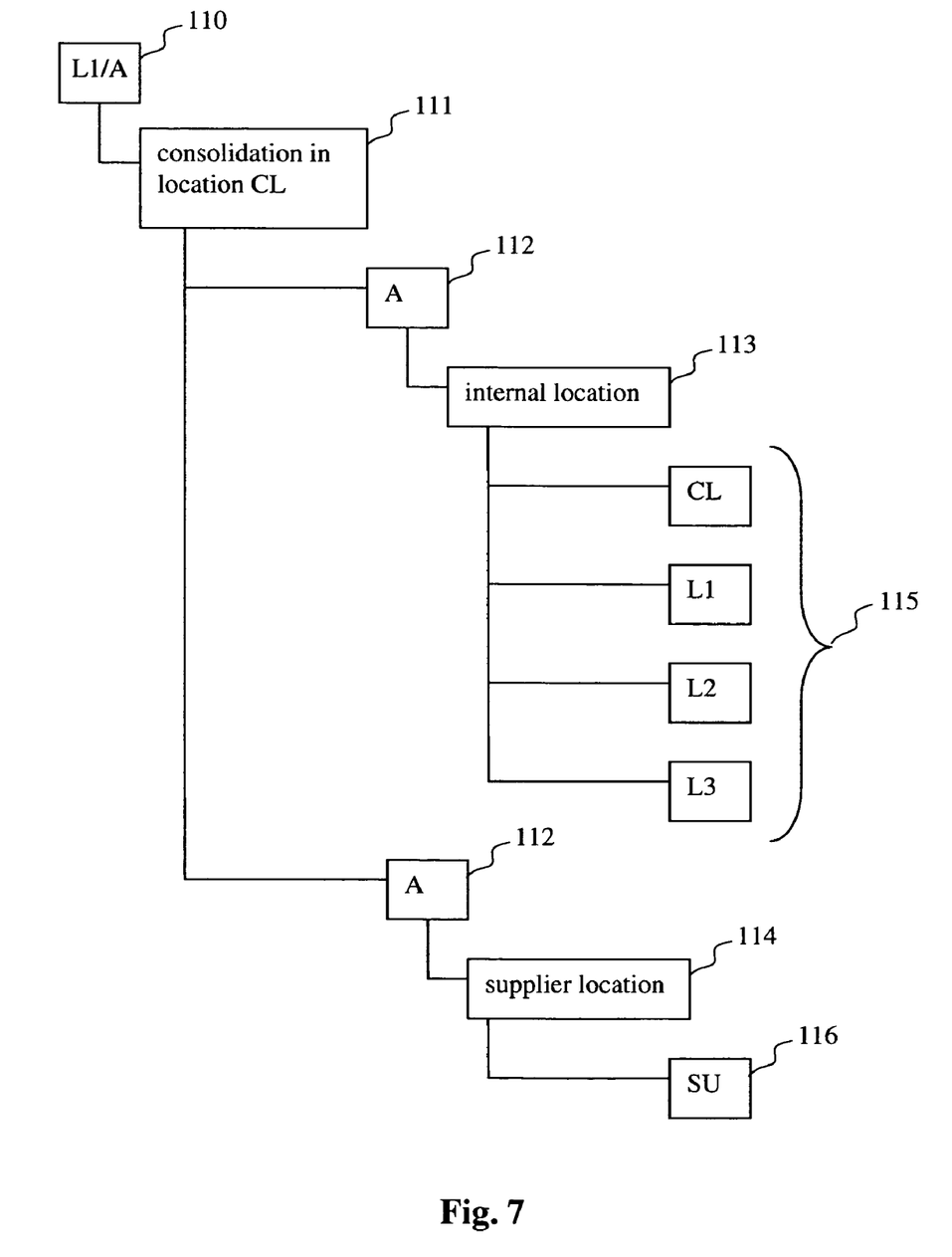
FIG. 7 illustrates an exemplary tree representation according to a controller structure, consistent with an embodiment of the present invention.

FIG. 7 shows an exemplary tree representation according to the controller structure shown in FIG. 5. A tree representation may be used, for example, for visualizing the controller structure. In such a tree representation, it is useful to distinguish between confirmations coming from internal locations and confirmations coming from external locations.

In one embodiment, the tree representation is built-up within the main memory. This means that the tree representation is not stored in a data storage. At first, the method creates a root node 110, the anchor item. The root node represents the location product L1/A. As a next step, node 111 representing the consolidation in consolidation location CL is created and linked as a child node to root node 110.

Now, two nodes 112 are created representing the product A which are consolidated in the consolidation location. These two nodes 112 are inserted as child nodes of consolidation node 111 into the tree representation. For first location node 112, a child node 113 is created which summarizes the internal locations. Below the child node 113, nodes 115 for each internal location are created. For second location node 112, a child node 114 is created which summarizes the external locations. Below child node 114, nodes 116 for each external location are created.

In one embodiment, only one product node 112 may be created, whereby location nodes 113, 114 may be created as child nodes of product node 112. This tree representation represents the fact that the confirmations coming from internal locations and the confirmations coming from external locations are separated.

The present techniques and embodiments described herein, including the exemplary systems and methods presented above, can be implemented in digital electronic circuitry, or in computer hardware, firmware, software, or in combinations of them. Apparatus consistent with the present invention can be implemented in a computer program product tangibly embodied in a machine-readable storage device for execution by a programmable processor.

Method steps according to embodiments of the invention can be performed by a programmable processor executing a program of instructions to perform functions or steps of the methods by operating on the basis of input data, and by generating output data. Embodiments of the invention may also be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, aspects of the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g., an RF communication link). A display is coupled to an interface, which is coupled to an I/O bus. A keyboard and pointing device are also coupled to the I/O bus. Alternatively, separate buses may be used for the keyboard pointing device and I/O interface.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for processing a product order that is directed from a customer to a first supplier, the method comprising:
    receiving, by a processor, a product order from a customer;
    determining, by the processor, based on the received product order, products to be procured by an external supplier that is external with respect to the first supplier;
    determining, by the processor, at least one external supplier which is able to provide the products, wherein determining the at least one external supplier is performed by evaluating data representing at least one of contracts and scheduling agreements between a product order receiver and the at least one external supplier and data that is related to an ordered product; and
    transmitting, by the processor, a purchase order for the available products to the at least one external supplier.

2. The computer-implemented method of claim 1, further comprising:
    evaluating a plurality of available-to-promise (ATP) rules, wherein each ATP rule comprises at least one instruction check.

3. The computer-implemented method of claim 2, wherein the instruction check comprises at least a first field indicating how a third party order process is performed and a second field indicating how to determine the at least one external supplier.

4. The computer-implemented method of claim 3, wherein the first field stores a value indicating to perform one of:
    a first availability check, then a third party order processing check;
    a third party order processing check immediately; or
    an availability check.

5. The computer-implemented method of claim 3, wherein the second field stores a value indicating to perform one of:
    a check against contracts;
    a check against scheduling agreements;
    a check against contracts and scheduling agreements;
    a check against contracts and scheduling agreements and information records;
    a check against contracts and information records;
    a check against scheduling agreements and information records; or
    no check against contracts or scheduling agreements.

6. The computer-implemented method of claim 1, further comprising:
   shipping the available products from the at least one external supplier to a consolidation location; and
   processing the available products at the consolidation location.

7. An apparatus for processing a product order that is directed from a customer to a first supplier, the apparatus comprising:
   a processor; and
   a memory storing instructions executable by the processor to:
   receive a product order from a customer;
   determine, based on the received product order, products to be procured by an external supplier that is external with respect to the first supplier;
   determine at least one external supplier which is able to provide the products, wherein the at least one external supplier is determined by evaluating data representing at least one of contracts and scheduling agreements between a product order receiver and the at least one external supplier and data that is related to an ordered product; and
   transmit a purchase order for the available products to the at least one external supplier.

8. The apparatus of claim 7, wherein the instructions are further executable by the processor to evaluate a plurality of available-to-promise (ATP) rules, wherein each ATP rule comprises at least one instruction check.

9. The apparatus of claim 8, wherein the instruction check comprises at least a first field indicating how a third party order process is performed and a second field indicating how to determine the at least one external supplier.

10. The apparatus of claim 9, wherein the first field stores a value indicating to perform one of:
    a first availability check, then a third party order processing check;
    a third party order processing check immediately; or
    an availability check.

11. The apparatus of claim 9, wherein the second field stores a value indicating to perform one of:
    a check against contracts;
    a check against scheduling agreements;
    a check against contracts and scheduling agreements;
    a check against contracts and scheduling agreements and information records;
    a check against contracts and information records;
    a check against scheduling agreements and information records; or
    no check against contracts or scheduling agreements.

12. The apparatus of claim 7, further comprising:
    a data storage for storing a plurality of available-to-promise (ATP) rules, contracts, scheduling agreements, and product-related data.

13. A non-transitory computer-readable storage medium storing program instructions for processing a product order that is directed from a customer to a first supplier according to a method, the method comprising:
    receiving a product order from a customer;
    determining, based on the received product order, products to be procured by an external supplier that is external with respect to the first supplier;
    determining at least one external supplier which is able to provide the products, wherein determining the at least one external supplier is performed by evaluating data representing at least one of contracts and scheduling agreements between a product order receiver and the at least one external supplier and data that is related to an ordered product; and
    transmitting a purchase order for the available products to the at least one external supplier.

14. The non-transitory computer-readable storage medium of claim 13, further comprising:
    evaluating a plurality of available-to-promise (ATP) rules, wherein each ATP rule comprises at least one instruction check.

15. The non-transitory computer-readable storage medium of claim 14, wherein the instruction check comprises at least a first field indicating how a third party order process is performed and a second field indicating how to determine the at least one external supplier.

16. The non-transitory computer-readable storage medium of claim 15, wherein the first field stores a value indicating to perform one of:
    a first availability check, then a third party order processing check;
    a third party order processing check immediately; or
    an availability check.

17. The non-transitory computer-readable storage medium of claim 15, wherein the second field stores a value indicating to perform one of:
    a check against contracts;
    a check against scheduling agreements;
    a check against contracts and scheduling agreements;
    a check against contracts and scheduling agreements and information records;
    a check against contracts and information records;
    a check against scheduling agreements and information records; or
    no check against contracts or scheduling agreements.

18. The non-transitory computer-readable storage medium of claim 13, further comprising:
    shipping the available products from the at least one external supplier to a consolidation location; and
    processing the available products at the consolidation location.

* * * * *